United States Patent [19]

Rittler

[11] Patent Number: 4,715,987

[45] Date of Patent: Dec. 29, 1987

[54] METHOD OF TREATING PHYLLOSILICATES

[75] Inventor: Hermann L. Rittler, Corning, N.Y.

[73] Assignee: Corning Glass Works, Corning, N.Y.

[21] Appl. No.: 861,939

[22] Filed: May 12, 1986

[51] Int. Cl.$^4$ .............................................. B01J 13/00
[52] U.S. Cl. ................... 252/315.5; 252/62; 252/315.2; 252/378 R; 501/148
[58] Field of Search ............ 252/315.2, 315.5, 378 R, 252/62; 501/148; 264/178 R, 183

[56] References Cited

U.S. PATENT DOCUMENTS

| | | | |
|---|---|---|---|
| 2,531,427 | 11/1950 | Hauser | 252/315.2 X |
| 3,325,340 | 6/1967 | Walker | 162/3 X |
| 4,083,956 | 4/1978 | Shelton | 424/68 X |
| 4,339,540 | 7/1982 | Beall et al. | 501/3 |
| 4,350,605 | 9/1982 | Hughett | 252/309 X |
| 4,517,112 | 5/1985 | Mardis et al. | 252/315.2 |

OTHER PUBLICATIONS

Fieser et al.: *Advanced Organic Chemistry*, Reinhold Publ. Corp., New York, 1961, pp. 1014–1019.

*Primary Examiner*—Richard D. Lovering
*Attorney, Agent, or Firm*—C. S. Janes, Jr.

[57] ABSTRACT

This invention relates to a method for forming a product from a naturally occurring phyllosilicate, the method comprising the steps of:

(a) exposing the phyllosilicate to a source of exchangeable cations to effect a change in the chemical makeup of the phyllosilicate interlayer by ion transfer;

(b) exposing the ion-exchanged phyllosilicate to an expanding agent selected from the group consisting of a primary aminocarboxy acid, lysine orotate, and glycylglycine to expand the cell spacing and cause gel formation;

(c) flocculating the gel;

(d) forming a gel-floc interface; and (e) withdrawing the flocculated gel from that interface.

13 Claims, 1 Drawing Figure

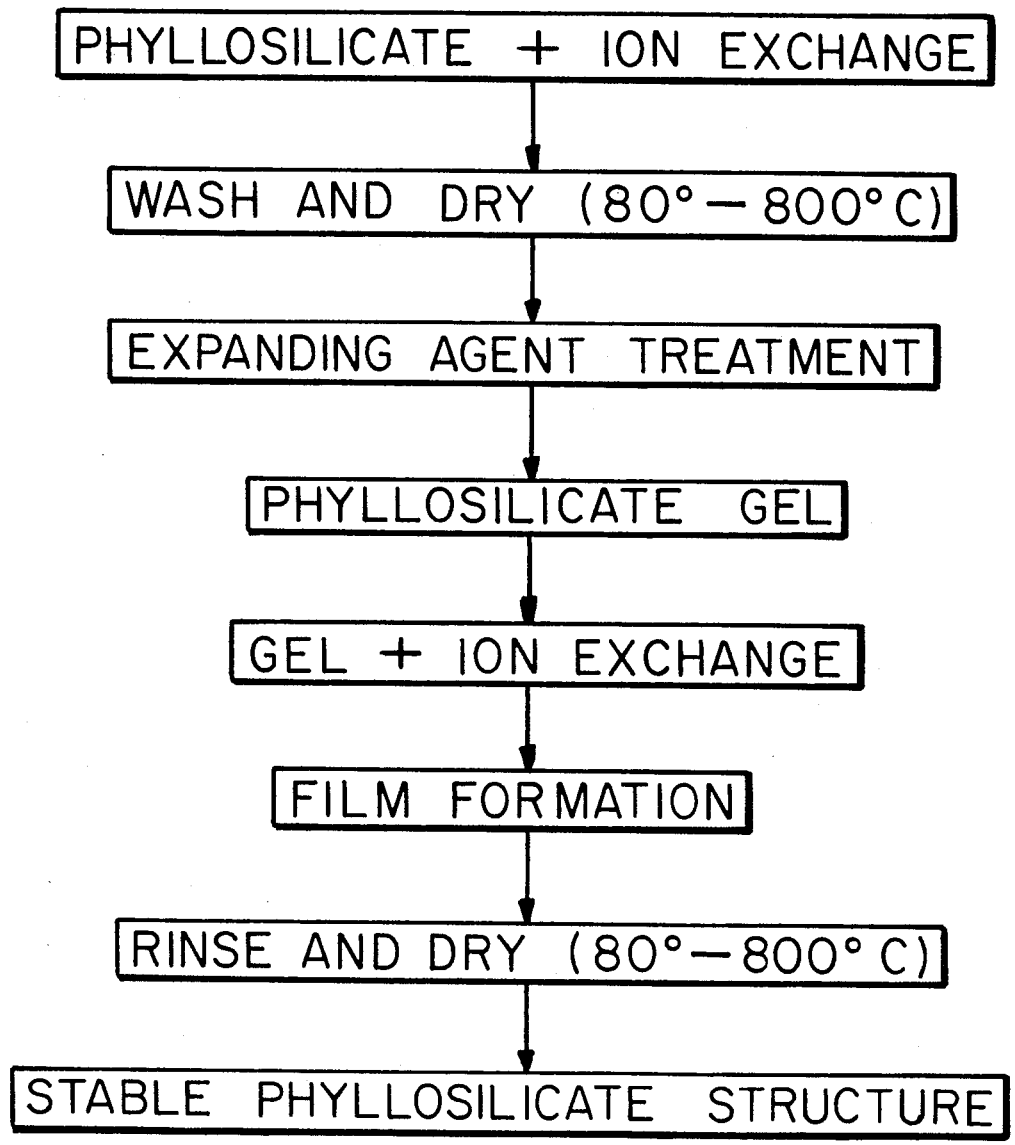

METHOD OF TREATING PHYLLOSILICATES

INTRODUCTION

This invention is concerned with generating useful gels from expandable, hydrated sheet silicates, also known as lattice layered silicates, or phyllosilicates. It is further concerned with use of such gels in producing drawn products such as films, sheets and fibers.

Essentially any natural hydrated or hydratable phyllosilicate may be treated. These silicate minerals include vermiculite, beidellite, nontronite, volchonskoite, saponite, stevensite, sauconite, pimelite, bentonite, montmorillonite, hectorite, the smectites, attapulgite, sepiolite, phlogopite and biopyrobole.

The three layers micas in general, and natural vermiculite in particular, have been extensively studied because of their potential for thermal resistance and electrical insulation. The interest has heightened considerably with the recent flight from asbestos products.

The term "vermiculite" refers to, and identifies, a specific mineral species. However, it is typical of, and may here be read as referring to, any hydratable, layer-latticed, expandable silicate structure, primarily the three layer micas. The silicate layer units in these minerals have a thickness of about 10 Angstrom units (Å), with the main elemental constituents being Mg, Al, Si and $O_2$. These silicate layers are separated by an interlayer composed of water molecules associated with cations, such as $MG^{++}$, $Ca^{++}$, $Na^+$, $K^+$ and $H^+$.

Sheet silicates of the mica type are built of two units, viz., a tetrahedral sheet and an octahedral sheet. The former consists of tetrahedra of Si—O linked together to form a hexagonal network such that the bases thereof are coplanar and the apices thereof point in the same direction. This configuration yields a Si:O ratio of 2:5. In contrast, the octahedral sheet is generated through the impingement of two tetrahedral sheets pointing toward each other and crosslinked by the sharing of oxygens by Mg (or Al,Fe) in octahedral coordination. The two octahedral corners not falling in the plane of apical oxygens are occupied by hydroxyl or fluoride ions. It is possible that a composite sheet formed in this manner will be electrically neutral, in which case Van der Waals-type forces bond it to the sheets immediately above and below. More commonly, however, an excess negative charge exists due to ion substitutions, unoccupied sites (vacancies), or a combination of both. Differences in properties arise both from the degree of charge deficiency as well as the location of the excess charge. Charge balance is restored through the uptake of foreign cations in interlayer positions in 12-fold coordination due to hexagonal rings of oxygens located in the sheets above and below.

In order to create a product for vermiculite, it is usually necessary to delaminate the particles. This involves separating the crystals at the interlayer to form high aspect ratio platelets. These may be suspended as a gel and subsequently deposited in any desired form, such as a sheet, or otherwise processed.

At one time, it was standard practice to heat vermiculite particles to an elevated temperature. This caused the water-containing interlayer to expand and pop open. Later, it was learned that vermiculite could be expanded by reflux treatment with various salts in aqueous solution. Thereafter, application of an intense shearing force to the expanded particles caused them to separate at the interlayer and form a gel.

RELATED LITERATURE

U.S. Pat. No. 3,325,340 (Walker et al.) describes a process for producing an aqueous suspension of vermiculite flakes which comprises treating crystals of vermiculite with a selected alkyl ammonium, lithium, lysine, or ornithine cation in an aqueous solution, immersing the crystals in water to promote swelling normal to the main cleavage plane, and subjecting the swollen crystals to intense mechanical shearing to form a stable suspension. Examples prescribe heating or refluxing for several hours in the solution of cation salt followed by immersion for a matter of hours to swell.

U.S. Pat. No. 3,434,917 (Kraus et al.) discloses a similar method wherein vermiculite ore is successively exposed to sodium chloriide and lithium chloride salt solutions, then immersed in water to swell, and finally subjected to intense mechanical shearing to form platelets. A specific example prescribes steeping the ore in salt solution for 24 hours.

United Kingdom Patent Specifications No. 1,593,382 and 1,593,383 disclose methods in which vermiculite is exposed to a salt of sodium, lithium, or an organo-substituted ammonium cation, followed by aqueous treatment and intense shearing action. The suspension thus produced may be washed, filtered, and then shaped against a mold as water is removed.

U.S. Pat. No. 4,305,992 (Langer et al.) discloses an intumescent sheet composed in part of unexpanded vermiculite flakes which have been ion exchanged with an ammonium ion. The patent also refers to several patents as showing thermal exfoliation of vermiculite.

U.S. Pat. No. 3,356,611 (Walker et al.) discloses treating vermiculite to render it dispersible in an organic medium. The treatment is ion exchange with a substituted ammonium, phosphonium, or sulphonium cation, the substituent being a saturated or unsaturated aliphatic chain, a polyoxyethylene chain, and/or an aromatic or heterocyclic ring.

My pending application, Ser. No. 742,954, filed June 10, 1985, abandoned and re-filed Apr. 7, 1986 as Ser. No. 848,791, now U.S. Pat. No. 4,676,929, discloses gels composed of hydrated phyllosilicates dispersed in a primary aminocarboxy acid, or lysine orotate, or N-glycylglycine as an expanding agent. Both organic and inorganic additions, as well as ion exchange products, are disclosed. The gels, with or without the additions, may be polymerized and may be formed or shaped. Also disclosed are method for generating the gels and for treating the gels generated.

U.S. Pat. No. 4,339,540 (Beall et al.) discloses production of gels from selected, synthetic, lithium and/or sodium water-swelling micas, flocculation of the gel and the production of papers, films, fibers, boards and coatings therefrom.

A publication by Isaac Barshad, in Soil Science Society Proceedings 1952, pages 176–182 and entitled "Factors Affecting the Interlayer Expansion of Vermiculite and Montmorillonite with Organic Substances," indicates that the determining factors are size, charge and total amount of the interlayer cations and magnitude of the dipole moment and the dielectric constant of the immersion liquid. Alcohols, ketones, ethers, amino acids and aromatics such as benzene were among the immersion liquids studied. There is no indication of gel formation.

PURPOSE OF THE INVENTION

A basic purpose is to convert natural phyllosilicates into drawn products, such as films, papers, or fibers.

A further purpose is to provide a unique arrangement of steps in effecting such conversion.

Another purpose is to provide a method wherein an ion exchange occurs in the interlayer of the phyllosilicate.

A specific purpose is to provide a method wherein an ion exchange in the interlayer is effected before the phyllosilicate structure is expanded.

Another specific purpose is to balance the charge in the phyllosilicate interlayer by ion exchange prior to cell expansion.

A further purpose is to produce a product, drawn from a natural phyllosilicate, that has a superior resistance to moisture pickup in service.

SUMMARY OF THE INVENTION

To these and other ends that will become apparent, my invention is a method of forming a product from a naturally occurring phyllosilicate, the method comprising exposing the phyllosilicate to a source of exchangeable cations to effect a change in the chemical makeup of the phyllosilicate interlayer by ion transfer, exposing the ion-exchanged phyllosilicate to an expanding agent selected from the primary aminocarboxy acids, lysine orotate, and glycylglycine to expand the cell spacing the cause gel formation, flocculating the gel, forming a gel-floc interface, and withdrawing the flocculated gel from that interface.

The exposure to a source of exchangeable cation may involve immersion of a phyllosilicate in a molten salt bath, or in an aqueous inorganic salt solution. Preferably, the latter is heated. The inorganic ion may be $Mg^{+2}$, $Li^+$, $Na^+$, $Ag^+$, $Cu^+$, $Co^{+2}$, $Ni^{+2}$, $K^+$, $K^+$, $Ba^{+2}$, $Ca^{+2}$, $Sr^{+2}$, $Ni^{+2}$, $Mn^{+7}$, $Zn^{+2}$, $Pb^{+2}$, $Sn^{+2}$, $Fe^{+2}$, $Cr^{++}$, $Al^{+3}$, $Zr^{+3}$, $Ti^{+4}$, $P^{-3}$, $S^{-2}$, $Cl^{-1}$, $F^{-1}$, $V^{+3}$, $B^{+3}$. The ion-exchanged phyllosilicate, as well as the drawn product formed, are preferably washed and dried to remove water and potentially contaminating salts.

GENERAL DESCRIPTION OF THE INVENTION

The present invention is essentially a modification or variation of the invention disclosed in my earlier application. Thus, both involve exposure of a phyllosilicate to an expanding agent to expand the cell structure. This action, accompanied by agitation, forms a gel from the phyllosilicate.

Thereafter, the expanded gel is flocculated by an ion exchange to form a stable product. In the present instance, the floc is drawn from an interface to form a thin film, sheet, or fiber. The particular manner of drawing may be as disclosed for synthetic micas in the Beall et al. patent.

The present invention is essentially a preliminary treatment of the phyllosilicate in which the phyllosilicate is exposed to a source of exchangeable cations. The changes that occur may be studied by x-ray diffraction, differential thermal, and chemical analyses, as well as by particle size measurement. Thus, the exposure to ion exchange can produce delaminated materials having an average particle size in the range of about 1 to about 20 microns, and wherein from 50 up to 90 plus % will pass through a 325 mesh screen.

Typical unit cell basal spacing (001) values are lowered from 14 Å to 10 Å in the case of vermiculite. This indicates depletion of the hydroxyl ion in the interlayer and balancing of charge. Gravimetric determinations were made on $K^+$ treated materials, after cycling from either 300° C. or 600° C. to 25° C., while maintaining 75% relative humidity RH. These determinations showed a change of less than 1%, thus indicating stability against moisture pickup. Differential thermal analyses failed to show the endothermic reactions at 100° C., 200° C. and 820° C. that are regarded as typical of natural mica-type materials.

These analyses lead to the conclusion that the preliminary step involves an ion exchange or transfer in which exchangeable cations, such as sodium, lithium, or magnesium ions, move into the interlayer between the silicate layers in a phyllosilicate structure. The exchangeable ions react with and/or move water held in the interlayer. They may also occupy vacant sites in the lattice, thereby restoring balance to the electrical charge.

The ion exchange may be effected from either a molten salt bath or from an aqueous solution. The requisite condition in any case is an ionized material source capable of yielding an exchange ion. Exchange rate is generally enhanced by temperature. This, as well as the exclusion of water, favors a molten salt bath. However, a heated aqueous solution is often more convenient to control.

The use of molten salt baths for ion exchange purposes is extensively described in prior literature. The alkali chlorides and nitrates, alone or in eutectic mixtures, have been used. For example, a mixture of potassium salts operated at a eutectic temperature of 680° C. may be quite suitable.

The exposure may simply involve feeding the phyllosilicate into the molten salt bath, allowing the desired reaction to take place in a time of 15 minutes to an hour, and separating the reacted phyllosilicate from the salt. At this stage the interlayer spacing is about 10 Å, as shown by x-ray measurements.

Alternatively, the phyllosilicate may be heated in a salt solution, e.g., a concentrated aqueous solution of corresponding alkali metal salts. This may be accelerated by working under pressure, or by refluxing in known manner.

The reacted phyllosilicate may then be separated from the ion exchange salts and washed thoroughly to remove the excess salts. The washed material may be dried, for example, by heating in an oven for an hour at a temperature in the range of 80° C. to 800° C.

The dry phyllosilicate is then mixed with an expanding agent, for example, an aminocarboxy acid such as glycine or beta-alanine. This expands the phyllosilicate interlayer and results in gel formation. This step is described in detail in my pending application noted above, and that application is incorporated herein by reference to avoid repetition.

For example, an ion exchanged vermiculite may be expanded from about 10 Å to about 20 Å. Particularly suitable aminocarboxy acids are glycine, beta-alanine, and amino-caproic acid.

The gel thus formed may then be flocculated by exposure to an ion exchange solution. In particular, the ions employed may be alkali metal, alkaline earth, or ammonium ions in aqueous solution.

I have further found that, if the gel is introduced as a thin stream, and if a sheet or film is withdrawn from the line of introduction, a continuous sheet of film can be produced. The procedure may, for example, correspond to that described in U.S. Pat. No. 4,339,540 (Beall et al.) mentioned earlier. The teaching of the patent is incorporated by reference.

Experience has shown that films and sheets drawn from natural phyllosilicates tend to be somewhat fragile and susceptible to separation or tearing. I have further found that this problem can be alleviated by addition of a synthetic mica gel such as described in the Beall et al. patent. As little as 10% of a fluor-hectorite gel added to a vermiculite gel may be sufficient. However, larger amounts may further enhance strength and other properties.

BRIEF DESCRIPTION OF THE DRAWINGS

The invention is further described with reference to the accompanying drawing wherein a step-by-step procedure for carrying out the invention is set forth in general terms.

Step 1 is an ion exchange step in which a selected phyllosilicate is reacted in a hot aqueous or molten salt bath to introduce cations such as indicated to react with water and other constituents of the phyllosilicate interlayer.

Steps 2 and 7 are optional steps generally employed to remove reactants and impurities, and provide a completely dry product for further processing. Any temperature within the indicated range may be employed.

Step 3 involves contacting the ion-exchanged phyllosilicate with an expanding agent known to expand the phyllosilicate and create therefrom the phyllosilicate gel of Step 4.

Step 5 is a further ion exchange step in which the gel is exposed to a cationic deflocculant, for example, a potassium ion.

Step 6 usually involves feeding the gel to an ion-containing bath in a thin stream, or like manner, whereby a film or sheet can be drawn from the interface between the solution and the gel. After rinsing and drying, this product has a stable phyllosilicate structure as indicated in Step 8.

It will be appreciated that ion exchange Steps 1 and 5 involve options. Thus, the particular phyllosilicate selected will depend on the properties desired in the ultimate film. Likewise, ultimate property and/or composition requirements may dictate the ion used. Thus a mixture of sodium salts may be desirable if a salt bath is used and the sodium ion is tolerable.

Finally, the ion used in flocculating the gel may be critical. Thus, potassium is commonly used because it has less tendency to migrate. However, for moisture resistance, organic complex cations have also been recommended.

RELATED APPLICATION

My application Ser. No. 862,256, filed on even date herewith and entitled "Phyllosilicate Treatment," discloses and claims, as a novel ceramic material, a solid solution of a natural phyllosilicate and at least one additional silicate or spinel phase. It also discloses and claims a method of producing such material by introducing a phyllosilicate into a salt bath to effect an ion exchange between the salt of the bath and the phyllosilicate. The ion-exchanged phyllosilicate is then subjected to a thermal treatment to develop the new phase that forms the solid solution with the phyllosilicate. The ion exchange and thermal treatment may be coincident, as in the case of a molten salt bath.

SPECIFIC EXAMPLES

Characteristic features of the present invention are the initial ion exchange treatment, and the chemical changes effected by the treatment.

These changes are shown herein by data measured on several different test samples. The test samples were provided by equal amounts of natural vermiculite taken from a common source. Each test sample was exposed to an ion exchange treatment with a different alkaline salt treatment.

Table 1 sets forth the sample numbers, the salt or mixture employed in each sample treatment, and the time-temperature cycle for the treatment. Sample 1 was a blank, that is, a sample that received no treatment. It was maintained as received for comparison purposes. Samples 2, 3 and 4 were each placed in an aqueous salt solution as indicated, and heated at 80° C. for 16 hours. Samples 5, 6, 7 and 8 were treated in molten salt baths having compositions and elevated operating temperatures as indicated.

TABLE I

| Sample | Salt | Time (hrs.) | Temp. (°C.) |
|---|---|---|---|
| 1 | | As received | |
| 2 | 6N NaCl | 16 | 80° |
| 3 | 6N KCl | 16 | 80° |
| 4 | 6N LiCl | 16 | 80° |
| 5 | Mg Cl$_2$ | 1 | 775° |
| 6 | LiCl—Li$_2$SO$_4$ | 1 | 500° |
| 7 | KCl—K$_2$SO$_4$ | ½ | 725° |
| 8 | KCl—K$_2$SO$_4$ | 2 | 800° |

Following the indicated salt treatment, each vermiculite sample was separated from the salt, thoroughly rinsed in deionized water, centrifuged, and dried to remove surface water. One portion of each sample was analyzed chemically by x-ray diffraction. A second portion was heated up to 1000° C. in three stages. The sample was weighed at the end of each stage to determine weight loss. The three hold temperatures were 110° C., 500° C. and 1000° C. This provided measurements of weight loss (WL) over the ranges (25°–110°), (110°–500°) and (500°–1000°). The total loss (WL$_T$) then is over the range 25°–1000°.

Table 2 sets forth the chemical analysis determined for each sample after the indicated treatment. Also presented are the weight losses (WL$_{110}$, WL$_{500}$, WL$_{1000}$ and WL$_T$) in percent as observed then each sample was fired.

It is readily apparent that much less weight loss is observed in samples treated in salt baths. Also, as indicated by the table, treatment with potassium ion exchange material tends to minimize loss. Finally, the changes in chemical makeup clearly indicate the ion exchange that occurs.

TABLE 2

| | 1 | 2 | 3 | 4 | 5 | 6 | 7 | 8 |
|---|---|---|---|---|---|---|---|---|
| SiO$_2$ | 39.8 | 39.8 | 41.6 | 40.5 | 28.9 | 53.6 | 41.5 | 42.1 |
| Al$_2$O$_3$ | 8.2 | 6.7 | 7.1 | 8.2 | 6.1 | 4.8 | 9.4 | 9.4 |
| Fe$_2$O$_3$ | 5.4 | 5.4 | 5.6 | 5.6 | 2.0 | 6.0 | 6.3 | 6.3 |
| TiO$_2$ | 0.6 | 0.6 | 0.6 | 0.6 | 0.6 | 0.6 | | |
| MgO | 25.3 | 24.2 | 26.1 | 25.6 | 57.1 | 19.9 | 27.9 | 27.7 |
| CaO | 3.4 | 4.2 | 3.5 | 2.1 | 0.16 | 14.2 | 1.0 | 0.7 |
| K$_2$O | 3.9 | 2.4 | 5.4 | 3.5 | 0.03 | 0.06 | 8.7 | 9.2 |
| Na$_2$O | 0.03 | 2.0 | 0.01 | 0.04 | — | 0.03 | 0.04 | 0.03 |
| Li$_2$O | | | | 0.7 | | 1.02 | | |
| WL 25–110 | 5.4 | 6.9 | 2.1 | 5.0 | 0.7 | 0.2 | 0.5 | 0.4 |
| WL 110–500 | 2.0 | 2.2 | 2.9 | 3.7 | 5.3 | 0.3 | 0.5 | 0.4 |
| WL 500–1000 | 6.0 | 6.5 | 6.3 | 5.5 | 0.6 | 0.3 | 3.1 | 3.2 |

TABLE 2-continued

|   | 1 | 2 | 3 | 4 | 5 | 6 | 7 | 8 |
|---|---|---|---|---|---|---|---|---|
| $WL_T$ | 13.4 | 15.6 | 11.3 | 14.2 | 6.7 | 0.8 | 4.1 | 4.0 |

I claim:

1. A method of forming a product from a naturally-occurring phyllosilicate which comprises exposing the phyllosilicate to a source of exchangeable ions to effect a change in the chemical makeup of the phyllosilicate interlayer by ion transfer, exposing the ion-exchanged phyllosilicate to an expanding agent selected from the group consisting of a primary aminocarboxy acid, lysine orotate, and glycylglycine to expand the cell structure and cause gel formation, flocculating the gel, forming gel-floc interface, and withdrawing flocculated gel from the gel-floc interface.

2. The method according to claim 1 wherein the naturally-occurring phyllosilicate is vermiculite.

3. A method according to claim 1 wherein the naturally-occurring phyllosilicate is montmorillonite.

4. A method according to claim 1 wherein the source of exchangeable cations to which the phyllosilicate is exposed is an aqueous solution of an inorganic salt.

5. A method according to claim 4 wherein the salt is magnesium chloride.

6. A method according to claim 1 wherein the source of exchangeable cations to which the phyllosilicate is exposed is a molten inorganic salt bath.

7. A method according to claim 6 wherein the salt bath is a mixture of sodium salts.

8. A method according to claim 1 wherein the ion-exchanged material is freed of contaminating salts and dried at a temperature in the range of 80°–800° C.

9. A method according to claim 1 wherein the aminocarboxy acid is beta-alanine.

10. A method according to claim 1 wherein the gel is exposed to a potassium ion containing bath to flocculate the gel.

11. A method according to claim 1 wherein the gel is introduced into an ion exchange bath in a thin stream to form a floc-gel interface from which a film of flocculated gel is withdrawn.

12. A method according to claim 1 wherein the gel formed from the natural phyllosilicate has a gel of a synthetic mica added prior to flocculation and the mixture introduced into the ion exchange bath to flocculate the gel.

13. A method according to claim 1 wherein the ion exchange bath is an aqueous solution of a potassium salt.

* * * * *

UNITED STATES PATENT AND TRADEMARK OFFICE
CERTIFICATE OF CORRECTION

PATENT NO. : 4,715,987
DATED : December 29, 1987
INVENTOR(S) : Hermann L. Rittler It is certified that error appears in the above-identified patent and that said Letters Patent is hereby corrected as shown below:

Column 1, line 17, "layers" should read --layer--.

Column 1, line 31, "$MG^{++}$" should read --$Mg^{++}$--.

Column 1, line 57, "for" should read -- from --.

Column 2, line 51 "method" should read --methods--.

Column 3, line 37, delete one occurrence of "$K^+$".

Column 6, line 48, "then" should read --when--.

Column 8, line 25, (Claim 13), "claim 1" should read --claim 12--.

Signed and Sealed this

Twenty-fifth Day of October, 1988

Attest:

DONALD J. QUIGG

*Attesting Officer*    *Commissioner of Patents and Trademarks*